(12) United States Patent
Baik

(10) Patent No.: US 6,721,116 B1
(45) Date of Patent: Apr. 13, 2004

(54) METHOD FOR DETERMINING WHETHER TAPE IS RECORDABLE AND APPARATUS THEREFOR

(75) Inventor: Sei-Hyun Baik, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 485 days.

(21) Appl. No.: 09/588,786

(22) Filed: Jun. 7, 2000

(30) Foreign Application Priority Data

Jun. 7, 1999 (KR) .......................................... 1999-20968

(51) Int. Cl.⁷ .............................................. G11B 15/04
(52) U.S. Cl. ........................................... 360/60; 360/31
(58) Field of Search ................................ 360/75, 1–68, 360/137, 78; 711/100

(56) References Cited

U.S. PATENT DOCUMENTS

| | | | | |
|---|---|---|---|---|
| 4,969,139 A | * | 11/1990 | Azumatani et al. | 369/54 |
| 5,877,906 A | * | 3/1999 | Nagasawa et al. | 360/15 |
| 5,936,786 A | * | 8/1999 | Go | 360/72.2 |
| 6,141,164 A | * | 10/2000 | Ishibashi et al. | 360/53 |
| RE37,904 E | * | 11/2002 | Lee | 386/46 |

FOREIGN PATENT DOCUMENTS

KR 97-50254 7/1997

\* cited by examiner

Primary Examiner—David Hudspeth
(74) Attorney, Agent, or Firm—Robert E. Bushnell, Esq.

(57) ABSTRACT

A method for recording data in a tape recorder, in particular, a method for determining whether a tape is recordable, and an apparatus therefor are provided. The method for determining whether a tape is recordable includes the steps of reproducing data and error correction data related to the data from a tape, correcting errors in the data using the error correction data, counting errors detected in said correcting step, determining that the tape is new and is recordable when the number of counted errors is larger than a first threshold value, and determining that the tape is not recordable when the number of counted errors is smaller than the first threshold value and is larger than a second threshold value. The first threshold value is larger than the second threshold value. According to the method for determining whether the tape is recordable, it is possible to inform the user whether the tape is recordable by determining the degree of deterioration and crosstalk of the tape.

44 Claims, 3 Drawing Sheets

METHOD FOR DETERMINING WHETHER TAPE IS RECORDABLE AND APPARATUS THEREFOR

CLAIM OF PRIORITY

This application makes reference to, incorporates the same herein, and claims all benefits accruing under 35 U.S.C. §119 from an application for DECIDING METHOD FOR PROBABILITY OF TAPE- USING AND DE VICE THEREFOR earlier filed in the Korean Industrial Property Office on the Jun. 7, 1999 and there duly assigned Ser. No. 20968/1999.

BACKGROUND OF THE INVENTION

1. Technical Field

The present invention relates to a method for recording signals in a tape recorder, and more particularly, to a method for determining whether a tape is recordable and an apparatus therefor.

2. Related Art

Digital video tape recorders are devices for recording digitally converted video signals onto tapes. The number of times which the signals can be reproduced with guaranteed quality is restricted due to the recording characteristics of tapes. It is not possible to guarantee the quality of the reproduced signals when signals have been recorded more than the restricted number of times. Also, since recorded data is digital data, when some of the data is damaged, many undamaged parts of the data related to the damaged part also cannot be recovered.

Also, when crosstalk occurs in a tape, it is not possible to normally reproduce the signals since various errors occur in reproduced signals.

SUMMARY OF THE INVENTION

To solve the above problems, it is an object of the present invention to provide a method for determining whether a tape is recordable.

It is another object of the present invention to provide an apparatus suitable for the above method.

It is a further object of the present invention to provide a method and apparatus for determining whether a medium is recordable.

It is still a further object of the present invention to provide a method and apparatus for identifying a quality level of a medium in order to determine whether the medium is recordable.

Accordingly, to achieve these objects and others, there is provided a method for determining whether a tape is recordable, comprising the steps of reproducing data and error correction data related to the data from a tape, correcting errors in the data using the error correction data, counting errors detected in the correcting step, and determining that the tape is not recordable when the number of counted errors is larger than a number I of errors by which the tape can be determined not to be recordable.

To further achieve these objects and others, there is provided an apparatus for determining whether a tape is recordable in a digital video tape recorder for recording data on and reproducing data from a digital video tape on which data and error correction data are recorded. The apparatus comprises an error corrector for correcting errors in data using the error correction data reproduced from the tape for a predetermined reproducing period, a counter for counting the errors detected by the error corrector, and a comparator for comparing the count result of the counter with a predetermined threshold value, wherein it is determined by the comparator that the tape is not recordable when the number of errors detected by the error corrector is larger than a second threshold value by which the tape can be determined not to be recordable.

To achieve these and other objects in accordance with the principles of the present invention, as embodied and broadly described, the present invention provides a method, comprising: reading data and error correction information stored on a medium; correcting errors in said stored data in dependence upon said error correction information; counting said errors in said stored data; and when quantity of said counted errors is larger than a first predetermined quantity of errors, determining that the medium is not recordable.

To achieve these and other objects in accordance with the principles of the present invention, as embodied and broadly described, the present invention provides a method of identifying when a medium is recordable, comprising: reproducing data and error correction information stored on a medium; correcting errors in said stored data in dependence upon said error correction information; counting said errors in said stored data; and when quantity of said counted errors is larger than a first predetermined quantity of errors, determining that the medium is not recordable.

To achieve these and other objects in accordance with the principles of the present invention, as embodied and broadly described, the present invention provides an apparatus, comprising: a first unit correcting errors in data in dependence upon error correction information, said data and error correction information being stored in a medium; a counter counting said errors in said data; and a comparator comparing quantity of said counted errors with a first predetermined value; the medium being not recordable when said quantity of said counted errors is larger than said first predetermined value.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to person of skill in the appropriate arts, and not as limiting upon the present invention.

Figure 1:
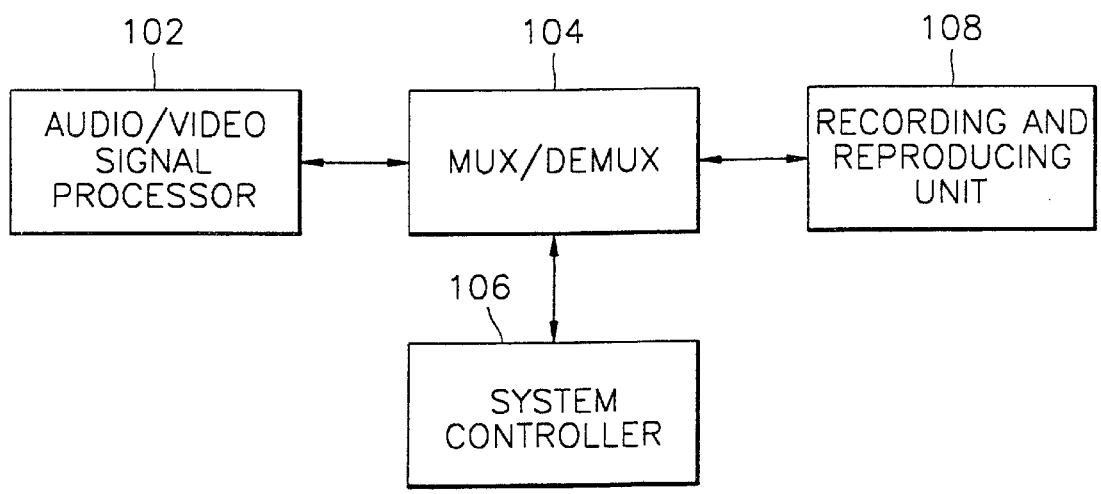
FIG. 1 is block diagram showing the structure of a digital tape recorder.

Hereinafter, the structure and operation of the present invention will be described in detail with reference to the attached drawings. FIG. 1 is a block diagram showing the structure of a digital tape recorder. The apparatus shown in FIG. 1 includes an audio/video signal processor 102, a multiplexer/demultiplexer 104, a system controller 106, and a recording and reproducing unit 108. The audio/video signal processor 102 compresses an input audio/video signal, or recovers a compressed audio/video signal. The multiplexer/demultiplexer 104 multiplexes audio data, video data, and system data compressed by the audio/video signal processor 102, or demultiplexes multiplexed and compressed audio data, video data, and system data, and provides the compressed and multiplexed audio data, video data, and system data or the compressed and multiplexed and then demultiplexed audio data, video data, and system data to the audio/video signal processor 102. The multiplexer/demultiplexer 104 corresponds to an Motion Picture Experts Group (MPEG) system encoder/decoder.

The system controller 106 generates system data and provides the detected system data to the multiplexer/demultiplexer 104, or controls the operation of the apparatus shown in FIG. 1. The recording and reproducing unit 106 reformats the multiplexed data provided by the multiplexer/demultiplexer 104 according to a recording format and records the reformatted data on a tape (not shown), or recovers the data reproduced from the tape as the multiplexed data suitable for the multiplexer/demultiplexer 104 and provides the recovered data to the multiplexer/demultiplexer 104.

Figure 2:
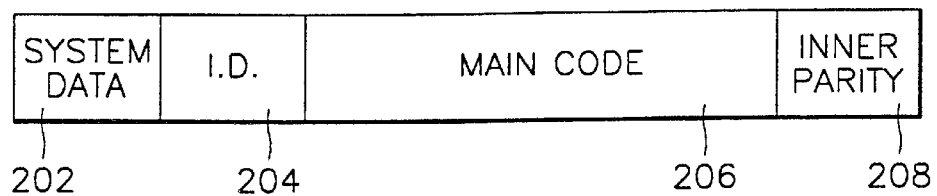
FIG. 2 shows the structure of data recorded on the tape by the apparatus shown in FIG. 1.

FIG. 2 shows the structure of the data recorded on a tape by the apparatus shown in FIG. 1. The data is recorded in regions of a block (a sync block) as shown in FIG. 2. The sync block includes a system data region 202 in which system data is recorded, an identification number region 204, a main code 206, and an inner parity region 208.

An error correction sign for correcting errors in the data recorded in the main code 206 is recorded in the inner parity region 208. The error correction sign recorded in the inner parity region 208 is used for determining the presence of errors in the data recorded in the main code 206 and correcting the detected errors when the data recorded on the tape is reproduced.

When the tape is aged or crosstalk occurs in the tape due to the influence of an outer magnetic field, the contents recorded in the main code 206 and the inner parity region 208 can be changed. Accordingly, errors increase during the reproduction of data.

Figure 3:
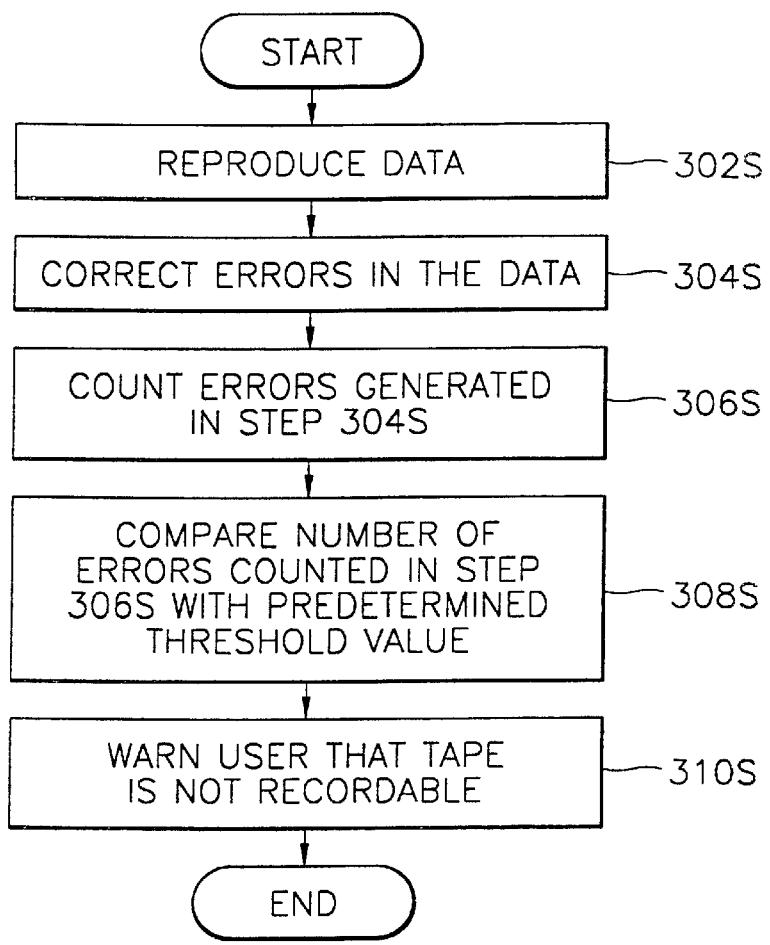
FIG. 3 is a flowchart describing a method for determining whether a tape is recordable, in accordance with the principles of the present invention.

In the present invention, it is determined whether a tape is recordable or not. When it is determined that the tape is not recordable, a user is warned. FIG. 3 is a flowchart describing a method for determining whether the tape is recordable, in accordance with the principles of the present invention. The method described in FIG. 3 includes a reproducing step 302S, an error correcting step 304S, an error counting step 306S, a comparing step 308S, and a warning step 310S. The tape is recordable when the quality level of the tape is high, and there is a small number of errors. The tape is not recordable if the quality level of the tape is low, and there is a large number of errors.

Data is reproduced from the tape for a predetermined time in the reproducing step 302S. Errors in the data are corrected using error correction data in the error correction step 304S. The number of errors detected in the error correction step 304S is counted in the error counting step 306S. The number of errors detected in a certain amount of tape or the number of errors detected in a certain amount of data is counted. The number n of errors counted in the error counting step 306S is compared with a predetermined threshold value, for example, the number I of errors by which the tape can be determined not to be recordable, in the comparing step 308S. When the number of counted errors is larger than the threshold value (n>I), the user is warned that the tape is not recordable by a display device in the warning step 310S.

Figure 4:
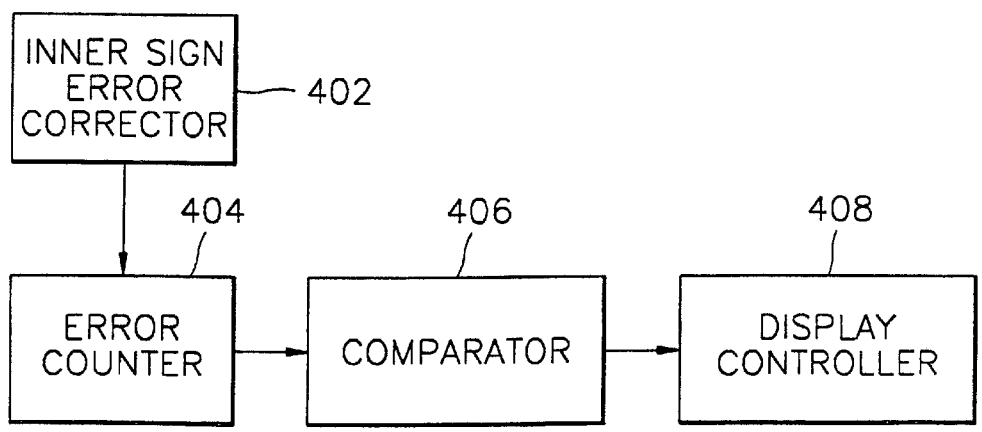
FIG. 4 is a block diagram showing the structure of an apparatus for performing the method of FIG. 3, in accordance with the principles of the present invention.

FIG. 4 is a block diagram showing the structure of an apparatus for performing the method shown in FIG. 3. The apparatus shown in FIG. 4 includes an inner sign error corrector 402, an error counter 404, a comparator 406, and a display controller 408.

The inner sign error corrector 402 corrects errors in the data using the error correction data. The error counter 404 counts the number of errors detected by the inner sign error corrector 402. The comparator 406 compares the number of errors counted by the error counter 404 with a predetermined threshold value, for example, the number of errors by which the tape can be determined not to be recordable. When the number of counted errors is larger than the threshold value, an error signal is provided to the display controller 410. The display controller 410 warns the user that the tape is not recordable by the display device.

Figure 5:
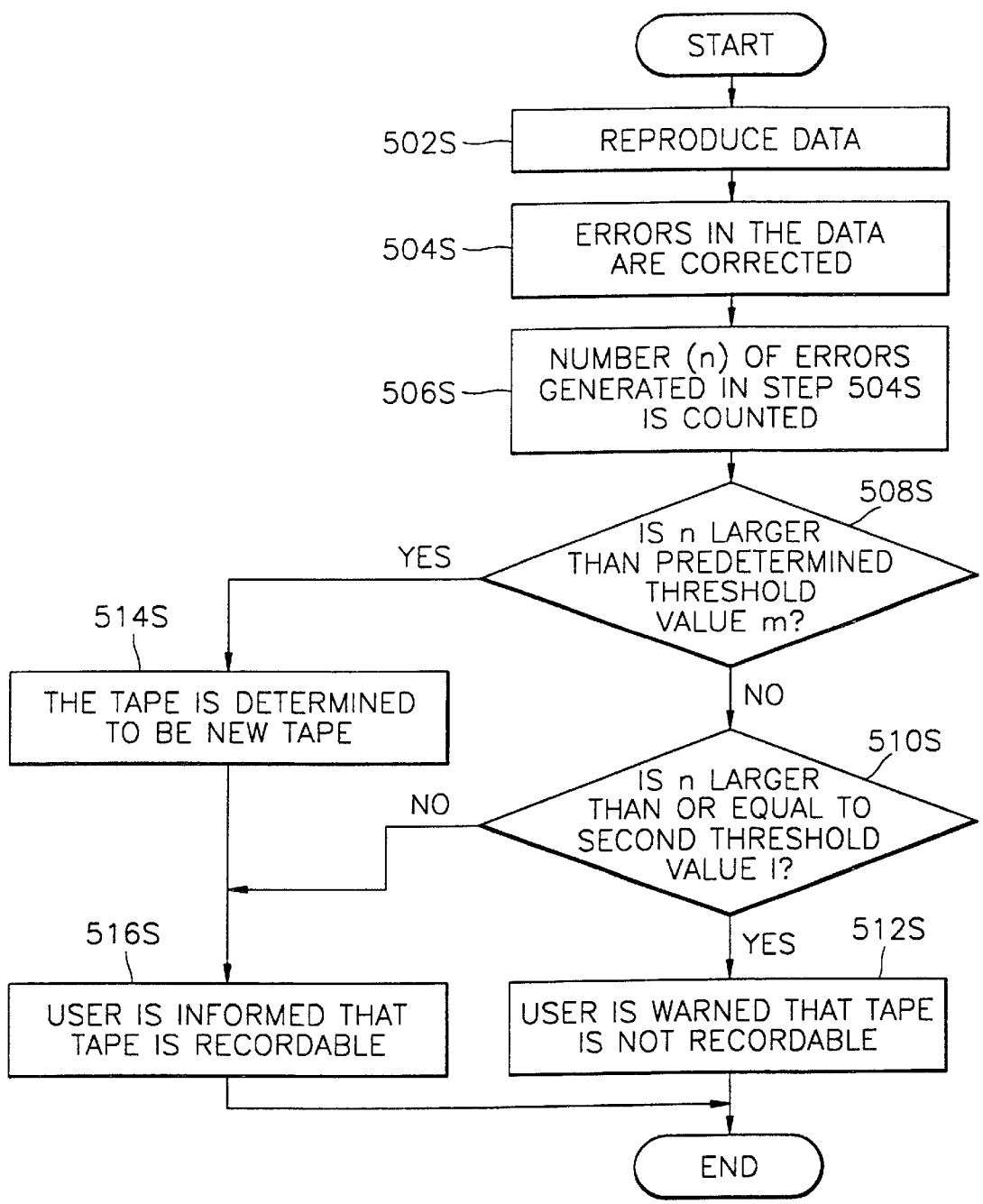
FIG. 5 is a flowchart describing another method for determining whether a tape is recordable, in accordance with the principles of the present invention.

In the method described in the flowchart of FIG. 3, the number n of counted errors is compared with the number I of errors by which the tape can be determined not to be recordable. However, in the case of a new tape, since no signal has yet been recorded on the tape, the number n of counted errors is larger than the number I of errors by which the tape can be determined not to be recordable. Accordingly, the user is warned that the tape is not recordable. FIG. 5 is a flowchart describing a method for solving this problem.

FIG. 5 is a flowchart describing another method for determining whether a tape is recordable, in accordance with the principles of the present invention. The method shown in FIG. 5 includes are producing step 502S, an error correcting step 504S, an error counting step 506S, comparing steps 508S and 510S, a new tape determining step 514S, and warning steps 512S and 516S.

Data is reproduced from the tape for a predetermined time in the reproducing step 502S. Errors in the data are corrected using error correction data in the error correcting step 504S. The number of errors detected in the error correcting step 504S is counted in the error counting step 506S. The number of errors detected in a certain amount of tape or the number of errors detected in a certain amount of data are counted.

The number n of errors counted in the error counting step 506S is compared with a predetermined first threshold value, for example, the number m of errors by which the tape can be determined to be a new tape. Here, the number m of errors by which the tape can be determined to be a new tape is set to be a value which is approximate to the maximum value M of errors which can be detected in the reproducing step 502S. This is because almost 100% of errors are detected compared with tapes in which crosstalk occurs or used tapes since no signal is recorded in the new tape.

When the number of counted errors is larger than the first threshold value (n>m), the tape is determined to be a new tape (514S) and the user is informed by the display device that the tape is recordable (516S).

The number n of errors counted in the error counting step 506S is compared with a predetermined second threshold value, for example, the number I of errors by which the tape can be determined not to be recordable, in the second comparing step 510S. When the number of counted errors is greater than or equal to the second threshold value (n≧I), the user is warned by the display device that the tape is not recordable in the warning step 512S.

When it is determined that the number n of errors counted in the error counting step 506S is less than the second threshold value (n<I) in the second comparing step (510S), the user is informed by the display device that the tape is recordable in the warning step (516S).

In the method for determining whether a medium is recordable according to the present invention, it is possible to inform the user whether the medium is recordable by determining the degree of deterioration and crosstalk of the medium. The medium can be a digital tape. When the medium is considered to be not recordable, the medium is determined to have a quantity of errors exceeding a predetermined threshold quantity of errors. When the medium is considered to be not recordable, the medium is not able to accurately store data. The medium can correspond to a tape, a digital tape, a digital video tape used in conjunction with a digital video tape recorder, a digital audio tape, and other types of recordable storage media.

If a user attempts to record data onto a medium that has been deemed to be not recordable, that data might not be able to be reproduced from the medium in the future. If that data is recovered from the medium in the future, that data might have an undesirable quantity of errors. A medium that is deemed to be not recordable is considered to be less reliable than a medium that is deemed to be recordable.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:
   reading data and error correction information stored on a medium;
   correcting errors in said stored data in dependence upon said error correction information;
   counting said errors in said stored data;
   when quantity of said counted errors is larger than a first predetermined quantity of errors, determining that the medium is a new medium and that the medium is recordable; and
   when said quantity of said counted errors is larger than a second predetermined quantity of errors, determining that the medium is not recordable.

2. The method of claim 1, said first predetermined quantity of errors being larger than said second predetermined quantity of errors.

3. The method of claim 1, further comprising:
   when said quantity of said counted errors is less than said second predetermined quantity of errors, determining that the medium is recordable.

4. The method of claim 3, said first predetermined quantity of errors being larger than said second predetermined quantity of errors.

5. The method of claim 1, further comprising:
   when the medium is not recordable, warning a user that the medium is not recordable.

6. The method of claim 5, wherein the warning corresponds to a displaying of a message indicating that the medium is not recordable.

7. The method of claim 1, said method determining whether the medium is recordable.

8. The method of claim 7, further comprising:
   when the medium is recordable, informing a user that the medium is recordable.

9. The method of claim 8, wherein said informing being performed by displaying a message indicating that the medium is recordable.

10. The method of claim 1, said reading of said data corresponding to reproducing said data.

11. A method of identifying when a medium is recordable, comprising:
    reproducing data and error correction information stored on a medium the medium corresponding to tape;
    correcting errors in said stored data in dependence upon said error correction information;
    counting said errors in said stored data;
    when quantity of said counted errors is larger than a first predetermined quantity of errors determining that the medium is a new medium and that the medium is recordable; and
    when said quantity of said counted errors is larger than a second predetermined quantity of errors, determining that the medium is not recordable.

12. The method of claim 11, said first predetermined quantity of errors being larger than said second predetermined quantity of errors.

13. The method of claim 11, further comprising:
    when said quantity of said counted errors is less than said second predetermined quantity of errors, determining that the tape is recordable.

14. The method of claim 13, said first predetermined quantity of errors being larger than said second predetermined quantity of errors.

15. The method of claim 11, further comprising:
    when the tape is not recordable, warning a user that the tape is not recordable.

16. The method of claim 15, wherein the warning is performed by displaying a message indicating that the medium is not recordable.

17. The method of claim 11, further comprising:
    when the tape is recordable, informing a user that the tape is recordable.

18. The method of claim 17, wherein said informing is performed by displaying a message indicating that the tape is recordable.

19. An apparatus, comprising:
    a first unit correcting errors in data in dependence upon error correction information, said data and error correction information being stored in a medium;
    a counter counting said errors in said data; and
    a comparator comparing quantity of said counted errors with a first predetermined value;

the medium corresponding to a new medium when said quantity of said counted errors is larger than said first predetermined value the new medium being recordable;

the medium being not recordable when said quantity of said counted errors is larger than a second predetermined value.

20. The apparatus of claim 19, the medium corresponding to a digital tape.

21. The apparatus of claim 20, said apparatus identifying when the digital tape is recordable in a digital tape recorder, said digital tape recorder recording digital data on and reproducing digital data from the digital tape on which said data and error correction information are recorded.

22. The apparatus of claim 21, the medium being recordable when said quantity of said counted errors is less than said second predetermined value.

23. The apparatus of claim 22, said first predetermined value being larger than said second predetermined value.

24. The apparatus of claim 21, said first predetermined value being larger than said second predetermined value.

25. The apparatus of claim 24, further comprising a display controller controlling a display device in dependence upon said comparing performed by said comparator, said display device displaying a warning when the medium is not recordable.

26. The apparatus of claim 25, said first unit performing said correcting of said errors in said data for a predetermined quantity of time.

27. The apparatus of claim 25, said first unit performing said correcting of said errors in said data for a predetermined reproducing period.

28. The apparatus of claim 25, said first unit performing said correcting of said errors in said data for a predetermined quantity of said data.

29. The apparatus of claim 20, further comprising a display controller controlling a display device in dependence upon said comparing performed by said comparator, said display device displaying a warning when the medium is not recordable.

30. The apparatus of claim 20, said first unit performing said correcting of said errors in said data for a predetermined quantity of time.

31. The apparatus of claim 20, said first unit performing said correcting of said errors in said data for a predetermined quantity of said data.

32. The apparatus of claim 20, said apparatus identifying when the digital tape is recordable in a digital video tape recorder, said digital video tape recorder recording digital data on and reproducing digital data from the digital tape on which said data and error correction information are recorded.

33. The apparatus of claim 20, the medium being recordable when said quantity of said counted errors is less than said second predetermined value.

34. The apparatus of claim 33, said first predetermined value being larger than said second predetermined value.

35. The apparatus of claim 20, said first predetermined value being larger than said second predetermined value.

36. The apparatus of claim 19, the medium being recordable when said quantity of said counted errors is less than said second predetermined value.

37. The apparatus of claim 36, said comparator comparing quantity of said counted errors with said second predetermined value.

38. The apparatus of claim 37, said first predetermined value being larger than said second predetermined value.

39. The apparatus of claim 19, said first predetermined value being larger than said second predetermined value.

40. The apparatus of claim 19, said first unit performing said correcting of said errors in said data for a predetermined quantity of said data.

41. The apparatus of claim 19, said first unit performing said correcting of said errors in said data for a predetermined quantity of time.

42. The apparatus of claim 19, further comprising a display controller controlling a display device in dependence upon said comparing performed by said comparator, said display device displaying a warning when the medium is not recordable.

43. The apparatus of claim 42, said first unit performing said correcting of said errors in said data for a predetermined quantity of time.

44. The apparatus of claim 42, said first unit performing said correcting of said errors in said data for a predetermined quantity of said data.

* * * * *